(12) United States Patent
Riedel

(10) Patent No.: US 9,122,748 B2
(45) Date of Patent: Sep. 1, 2015

(54) MATCHING DOCUMENTS AGAINST MONITORS

(75) Inventor: Lance Riedel, Menlo Park, CA (US)

(73) Assignee: Jive Software, Inc., Portland, OR (US)

(*) Notice: Subject to any disclaimer, the term of this patent is extended or adjusted under 35 U.S.C. 154(b) by 245 days.

(21) Appl. No.: 13/429,190

(22) Filed: Mar. 23, 2012

(65) Prior Publication Data
US 2013/0254211 A1 Sep. 26, 2013

(51) Int. Cl.
*G06F 17/30* (2006.01)

(52) U.S. Cl.
CPC .... *G06F 17/30699* (2013.01); *G06F 17/30613* (2013.01)

(58) Field of Classification Search
None
See application file for complete search history.

(56) References Cited

U.S. PATENT DOCUMENTS

| | | | | |
|---|---|---|---|---|
| 5,915,249 | A * | 6/1999 | Spencer | 707/742 |
| 6,411,950 | B1 * | 6/2002 | Moricz et al. | 1/1 |
| 6,799,199 | B1 * | 9/2004 | Segal et al. | 709/207 |
| 2001/0049675 | A1 * | 12/2001 | Mandler et al. | 707/1 |
| 2009/0319508 | A1 * | 12/2009 | Yih et al. | 707/5 |
| 2010/0005108 | A1 * | 1/2010 | Fiebig et al. | 707/100 |
| 2011/0066620 | A1 * | 3/2011 | Redfern et al. | 707/741 |

OTHER PUBLICATIONS

Wikipedia, "Google Alerts," <en.wikipedia.org/wiki/Google_Alerts> 2 pages (accessed Mar. 10, 2012).
Wikipedia, MapReduce, <http://en.wikipedia.org/wiki/Mapreduce> 8 pages (accessed Mar. 10, 2012).
GigaAlert, "Frequently Asked Questions," <http://www.gigaalert.com/faqs.php#often> 4 pages (accessed Mar. 10, 2012).
Apache, "Welcome to Apache™ Hadoop™ !," <http://hadoop.apache.org/index.pdf> 4 pages (accessed Mar. 11, 2012).

* cited by examiner

*Primary Examiner* — Robert Beausoliel, Jr.
*Assistant Examiner* — Nirav K Khakhar
(74) *Attorney, Agent, or Firm* — Klarquist Sparkman, LLP

(57) ABSTRACT

Techniques and tools are described for matching documents against monitors. An index can be generated from a plurality of monitors, where the index represents the query logic of the plurality of monitors. The index can be searched using the documents as search queries. The searching can comprise matching the documents against the monitors using the query logic represented in the index. An index can be distributed to a plurality of computing devices to be searched at the plurality of computing devices, where each computing device searches a subset of a plurality of documents against the full index. Searching at the plurality of computing devices can be performed in parallel, and results can be aggregated at a central location.

25 Claims, 6 Drawing Sheets

MATCHING DOCUMENTS AGAINST MONITORS

BACKGROUND

The amount of content being created on the Internet is constantly increasing. Sources such as news articles, blog postings, Facebook postings, and Twitter postings contribute to the increasing amount of content. For example, Twitter alone currently produces more than 300 million pieces of content per day.

Sometimes, users want to be notified when a particular word or phrase is mentioned or discussed on the Internet. For example, a user may want to receive a notification when new content is generated that mentions a specific sports team that the user is following, or that mentions a specific company that the user is interested in (e.g., discusses a specific new product that the company is selling). Due to the huge amount of content that is being created on the Internet on a daily basis, it is a challenge to watch the content and perform such notifications.

Traditional search systems can provide for notifications when new content matches specific queries. For example, a traditional search system could index a day's worth of content (e.g., 300 million pieces of content) at the end of the day into a search engine. The traditional search system could then query the indexed content using users' queries to obtain matches. This solution using a traditional search system suffers from a number of limitations. For example, there may be a long lag time (e.g., a day) between creation of the content and when it is indexed and available for searching. In addition, maintaining an up-to-date index can be difficult due to the frequency of new content begin created (e.g., continuously indexing, re-indexing, or updating the index may not be practical). Furthermore, indexing a huge amount of content on a regular basis can be very time and computing resource intensive.

Because indexing documents can take a substantial amount of time (especially if the number of documents to index is large), it can be difficult to maintain an index that represents frequently changing activity. Furthermore, if an index is not maintained on a real-time (or near-real-time) basis, then results from the index will not reflect the current state of the content.

Furthermore, there are often many users, each of which may have a number of queries, and it may not be practical to check all the queries for all the users against an updated index of documents for new matches. For example, there could be thousands or millions (or more) queries, and to obtain up-to-date results, and each query would need to be sent to a search engine for processing each time the index is updated with new documents.

Therefore, there exists ample opportunity for improvement in technologies related to matching documents against queries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for matching documents against monitors. For example, an index of monitors can be generated and stored (e.g., the index representing query logic of the monitors). The index can be searched using documents as input (e.g., using the documents as the search queries). The searching can comprise matching documents against monitors stored in the index using the query logic associated with the monitors.

As another example, a method is provided for matching documents against monitors. The method comprises receiving a plurality of monitors, generating an index from the plurality of monitors (the index representing full query logic for the plurality of monitors), and storing the index for the plurality of monitors. The index is searchable using documents as queries (as search queries or search strings) to perform matching against the monitors stored in the index.

The method can further comprise receiving a plurality of documents, searching the index using the plurality of documents to determine matches between the plurality of documents and the plurality of monitors using the full query logic represented by the index, and outputting results of the searching. For example, results can comprise indications of which monitors matched which documents. Additional operations can be performed based on the results. For example, counts of matches can be saved (e.g., a count of matching documents for each monitor), and notifications of matches can be sent (e.g., sent to users associated with the monitors).

As another example, a search system is provided for matching documents against monitors. The search system comprises a processing unit, memory, and one or more computer-readable storage media storing computer-executable instructions for causing the search system to perform operations. The operations comprise receiving a plurality of monitors, generating an index from the plurality of monitors, the index representing full query logic for the plurality of monitors, and storing the index for the plurality of monitors, where the index is searchable using documents as queries to perform matching against the plurality of monitors.

As another example, a method is provided for matching documents against monitors (e.g., in a distributed environment). The method comprises storing an index at each of a plurality of computing devices, where the index is generated from a plurality of monitors, and where the index represents full query logic for the plurality of monitors. The method also comprises obtaining a set of documents, dividing the set of documents into a plurality of groups of documents corresponding to the plurality of computing devices, and sending each group of documents to its respective computing device for searching the index using the groups of documents as queries to perform matching against the plurality of monitors.

As another example, a method is provided for matching documents against monitors (e.g., in a distributed environment). The method comprises providing an index for storage at each of a plurality of computing devices, where the index is generated from a plurality of monitors, and where the index represents full query logic for the plurality of monitors, and receiving results of searching the index from each of the plurality of computing devices, where each computing device of the plurality of computing devices searches the index using a subset of a plurality of documents, and where each computing device of the plurality of computing devices searches a different subset of the plurality of documents.

The foregoing and other objects, features, and advantages of the invention will become more apparent from the following detailed description, which proceeds with reference to the accompanying figures.

DETAILED DESCRIPTION

The following description is directed to techniques and solutions for matching documents against monitors. For example, an index can be generated, where the index represents query logic (e.g., full query logic) for a set of monitors. The index can be searched using documents as input (using the documents as the search queries or search strings). The result of the search can comprise an indication of which monitors match which documents.

The traditional search engine approach is to create an index of all the documents (e.g., web pages, blog postings, instant messages, etc.) at a specific time (e.g., at the end of the day). Once the index is created, the index can be searched using the monitors as queries against the index. While the traditional approach may be feasible with a smaller amount of content (e.g., a smaller number of documents), the traditional approach suffers from a number of limitations, particularly as the amount of content (e.g., the number and/or size of the documents) increases. For example, the traditional approach can require substantial time and computing resources to index a huge number of documents on a periodic basis (e.g., on a daily basis). In addition, the traditional approach can suffer from significant lag time between the time the content is created and the time the content is indexed and searched. Furthermore, due to the size of the index of documents, searching the index can be inefficient.

Figure 1:
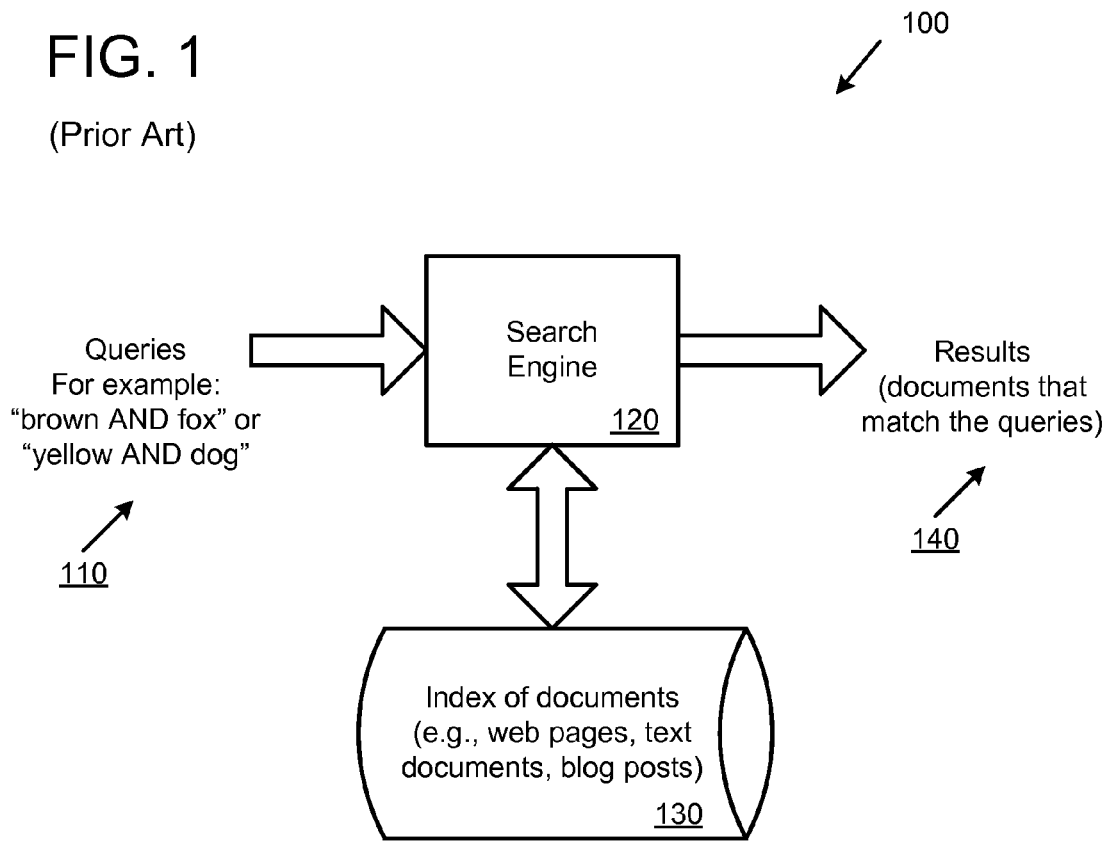
FIG. 1 is a diagram depicting an example prior art system for searching an index of documents using queries.

FIG. 1 is a diagram depicting an example prior art system 100 (a traditional search engine approach) for searching an index of documents using queries. In the system 100, a search engine 120 receives queries 110 as input (e.g., queries such as "brown AND fox"). The search engine 120 searches an index of documents 130 (e.g., web pages, text documents, blog posts, etc.) for documents that match the input queries 110. The search engine 120 outputs results 140, which can include a list of documents that match a particular query.

Instead of indexing the documents and searching the index using monitors as queries, an approach can be used in which monitors are indexed and the index is searched using documents as input (using the documents as the search queries). This approach can provide a number of benefits. For example, because monitors typically change infrequently, the index can be updated infrequently while still maintaining the current state of the monitors. Furthermore, an index of monitors is typically much smaller than an index of documents, and thus requires less storage. In some implementations, the index of monitors is maintained in RAM (or other cache facility) for quick and efficient access and processing. In addition, an index of monitors, due to its smaller size, can be more easily replicated between different machines (e.g., distributed to multiple servers). Such replication can allow for the index to be searched in parallel (e.g., by searching the full index at each machine, where each machine searches the full index using a subset of a set of documents).

Figure 2:
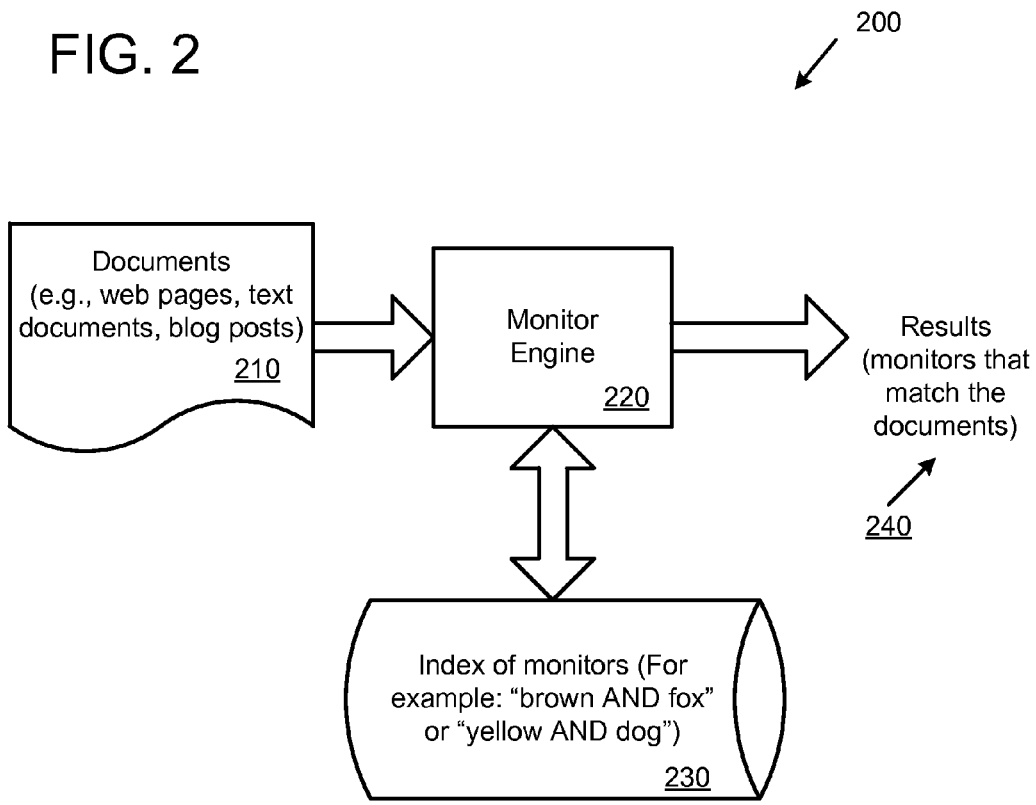
FIG. 2 is a diagram showing an example system for searching an index of monitors using documents.

FIG. 2 is a diagram showing an example system 200 for searching an index of monitors using documents as input (as the search queries). In the system 200, a monitor engine 220 receives documents 210 as input (e.g., documents such as web pages, text documents, blog posts, instant messages, etc). The monitor engine 220 searches an index of monitors 230 (e.g., monitors such as "brown AND fox" and "yellow AND dog") for monitors that match the input documents 210. The index of monitors 230 references the full query logic of the monitors, and the full query logic is used by the monitor engine 220 when performing the searching and matching. The monitor engine 220 outputs results 240, which can include a list of monitors that match a particular document. The results 240 can also comprise a score. For example, for each monitor, and for each document that is satisfied by the monitor, the score can comprise an indication of how closely the monitor terms match the document content.

The monitor engine 220 can be a custom developed application or a modified search engine. For example, a custom developed application can be programed to search an index of monitors, taking into account full query logic of the monitors when performing the search. Furthermore, a custom developed application can be programed to receive documents as input and use the documents as the search queries (e.g., after processing the documents to put them into a query format). A modified search engine can also perform these operations. For example, a search engine can be modified to take into account full query logic when searching the index. The search engine can also be modified to receive documents as input and use the documents as the search queries (e.g., after processing the documents to put them into a query format).

By generating an index of monitors with full query logic and searching the index using documents as queries, a large volume of documents can be processed efficiently. For example, an experimental distributed/parallel architecture of six servers processed 60,000 incoming documents per second using a monitor index of 5,000 monitors with full query logic of the monitors represented in the index.

Monitors

In the techniques and solutions described herein, a monitor refers to one or more terms in the format of a query. Content that satisfies the monitor (satisfies the query associated with the monitor) matches the monitor. Some examples of monitors are: "brown AND fox," "yellow AND cow," "brown AND fox AND NOT red," and "fox AND (brown OR white)."

A monitor can be used to search for content (e.g., documents) that match the monitor. For example, a user may want to watch for (e.g., be notified of) specific content on the Internet (e.g., new or modified web pages, news articles, blog postings, Twitter postings, Facebook posts, etc.). The user may want to watch (or monitor) specific content for a variety of reasons. For example, the user may be interested in the specific content (e.g., interested in new video game releases), or the user may want to monitor a specific company, brand, or product (e.g., track sentiment or opinion regarding a specific company, brand, and/or product).

Monitors can be associated with users or other types of entities (e.g., a business or organization). A user (or other type of entity) can create a number of different monitors, and the user can edit, change, and delete monitors. In some implementations, a monitor is an instance of a query search string associated with a specific entity.

Monitors can be indexed. For example, index information can be generated for a monitor. The index information can indicate terms (e.g., text or non-text terms) that are present in the monitor, and can further indicate operators (e.g., Boolean operators such as AND, OR, and NOT) that are present in the monitor as well as other query information (e.g., nesting, phrases, proximity (e.g., same sentence or paragraph, within a specific number of words), etc.). Monitor index information can be stored using, at least in part, an inverted index.

Documents

In the techniques and solutions described herein, documents refer to electronic information or content (e.g., available on the Internet). For example, documents can include word processing files, text files, blog posts, web pages, news articles, Twitter posts, Facebook posts, instant messages, or any other type of electronic information. Documents can be received. For example, new content from popular Internet sites or services can be received on a real-time, near real-time, and/or periodic basis (e.g., Twitter posts, blog posts, etc. can be received when, or soon after, they are created).

Documents can be provided as input (as queries) to a search engine (e.g., a monitor engine). For example, the individual terms (e.g., words and/or other text or non-text terms) of a set of documents can be provided as input to a search engine to match against monitors in an index.

Documents can be processed into a format suitable for use as a query. For example, common terms (e.g., "a," "and," and "the") can be removed, and the remaining terms (e.g., words) of a document can be formatted by placing "OR" operators between the terms. For example, the following document content:

A quick brown fox jumped over the fence. can be transformed into the following query format:

quick OR brown OR fox OR jumped OR over OR fence

Documents can be stored at a single location (e.g., a single database) or they can be distributed and stored at different locations (e.g., as distributed blocks of content). For example, a set of documents can be segmented and each subset of documents can be stored (and processed) by a different server.

Indexing Monitors

In the techniques and solutions described herein, monitors can be indexed. Indexing a monitor can comprise creating index information for the monitor (e.g., in the format of an inverted index or posting list). An index generated from a monitor also represents query logic for the monitor.

In some implementations, the full query logic of a monitor is represented by the index. For example, the index can store the full query logic for each monitor or the index can comprise a pointer to the full query logic for each monitor.

Consider the following example of two monitors:
Monitor 1: quick AND brown
Monitor 2: quick AND yellow
When these two monitors are indexed, the index can comprise an inverted index storing the monitors and query logic in the following format:
<word>: (list <monitor identifier: full query, . . . >)
Using the above example monitors (Monitor 1 and Monitor 2), the following inverted index would be generated using this inverted index format:
quick: (1: quick AND brown, 2: quick AND yellow)
brown: (1: quick AND brown)
yellow: (2: quick AND yellow)
As illustrated in the above example index, each word is listed along with its monitor identifier (e.g., a unique identifier for the monitor) and the full query logic associated with the monitor. Specifically, as shown in the above example index, the word "quick" is present in monitor identifier "1" and is associated with the full query logic "quick AND brown" (the full query of Monitor 1). In addition, the word "quick" is also present in monitor identifier "2" and is associated with the full query logic "quick AND yellow" (the full query of Monitor 2).

As another example, consider the same example of two monitors:
Monitor 1: quick AND brown
Monitor 2: quick AND yellow
When these two monitors are indexed, the index can comprise an inverted index storing the monitors and references (e.g., pointers) to the query logic in the following format:
<word>: (list <monitor identifier: reference to query, . . . >)
Using the above example monitors (Monitor 1 and Monitor 2), the following inverted index would be generated using this inverted index format:
quick: (1: ref1, 2: ref2)
brown: (1: ref1)
yellow: (2: ref2)
In addition, the following list of query logic would be stored (e.g., in a separate database or other type of data store):
ref1->quick AND brown
ref2->quick AND yellow
As illustrated in the above example index, each word is listed along with its monitor identifier (e.g., a unique identifier for the monitor) and a reference (e.g., pointer) to the full query logic associated with the monitor (e.g., using unique reference identifiers). For example, the full query logic could be stored in a separate database, file, or other type of data store. Storing the full query logic separately can reduce the total amount of storage required for the index (e.g., by only storing one copy of the full query logic for each monitor instead of storing the full query logic for each entry of the monitor in the index) and can increase lookup efficiency (e.g., by maintaining a cache of the full query logic), in certain processing scenarios.

As shown in the above example index, the word "quick" is present in monitor identifier "1" and is associated with the reference "ref1" to the full query logic associated with the monitor (ref1 is a reference or pointer to the full query logic "quick AND brown"). In addition, the word "quick" is also present in monitor identifier "2" and is associated with the reference "ref2" to the full query logic associated with the monitor (ref2 is a reference or pointer to the full query logic "quick AND yellow").

In a specific implementation, the index is stored in a payload area in the inverted index. The payload area provides unstructured data storage in the inverted index that can be used to store custom information in a search index. Depending on the implementation details, the payload area can store the full query logic or a reference (e.g., pointer) to the full query logic.

Monitors can have a complex query structure. For example, monitors can use query operators including: phrases, AND, OR, NOT, nested structures, proximity information, etc. Regardless of the complexity of the query structure for a specific monitor, the fully query logic can be stored in the index (e.g., stored directly or referenced).

Searching an Index of Monitors Using Documents

In the techniques and solutions described herein, an index of monitors can be searched using documents as input (e.g., using documents as the search query). In general, searching the index of monitors comprises processing each document to determine which monitors are satisfied by the document using the query logic associated with each monitor.

Consider the following example document:
A quick brown fox jumped over the fence.

Also consider the following two example monitors:
Monitor 1: quick AND brown
Monitor 2: quick AND yellow that generate the following inverted index:
quick: (1: quick AND brown, 2: quick AND yellow)
brown: (1: quick AND brown)
yellow: (2: quick AND yellow).

An example of searching the above example index using the above example document as the query can proceed as follows. First, the example document can be processed to remove common words, such as "a" and "the." Second, the result can be processed to create the query, "quick OR brown OR fox OR jumped OR over OR fence." Third, the document (in the query format) can be used to search the index. The first term of the document query, "quick," has a match in the index. Specifically, "quick" is found in Monitor 1 and Monitor 2 (the first entry in the inverted index above). An indication that "quick" has been found can be saved (e.g., in a cache or other data storage). Because the full query logic is accessible (either directly or via a reference or pointer) from the index, a determination can also be made of whether the full query logic for the monitor has been satisfied. In this example, because only the term "quick" has been found so far, the full query logic has not been satisfied for either Monitor 1 or Monitor 2. Next the second term of the document query, "brown," is searched and a match is found in the index (the second entry in the inverted index above). Specifically, "brown" is found in Monitor 1. From the full query logic for Monitor 1 ("quick AND brown"), and from the saved indication that "quick" has been previously found for Monitor 1, a determination can be made that the full query logic for Monitor 1 has now been satisfied (e.g., the result that Monitor 1 has been satisfied can be saved, e.g., in the cache). Next, the remaining terms of the document query (fox, jumped, over, and fence) are checked, and are not found in the index.

As a next step, the saved indications can be examined to determine which Monitors have been satisfied. In this example, Monitor 1 has been satisfied and Monitor 2 has not been satisfied. Results of the searching can be saved (e.g., an indication of which monitors matched which documents, or a count of the number of documents that matched each monitor) and other processing can be performed. For example, notifications can be made based on the results (e.g., a user associated with Monitor 1 can be notified that a document has been found that matches the monitor).

When searching an index of monitors, various techniques can be used to determine which monitors have been satisfied by an input document. For example, a list of monitors can be maintained, along with a list of found terms for each monitor and an indication of whether each monitor has been satisfied by the input document. In a first example implementation, a cache list is maintained with the following format:

Monitor ID: {list of found terms}, {Boolean—monitor query satisfied?}, {Boolean—monitor has NOT term(s)}

The first example implementation is a simplified example in which the monitors do not have any NOT terms.

The following procedure can be used to process documents using the cache list of the first example implementation:
For each term in the input document, if the term occurs in the inverted index:
Create a cache list entry for the monitor(s) if it does not already exist
Insert the found term into the cache list entry (or entries)
Check if full query for monitor is satisfied:
If so, mark satisfied (e.g., scoring can be performed normally)
If not, do not mark satisfied (e.g., score 0)
Consider the following example document:
A quick brown fox jumped over the fence.
Also consider the following three example monitors:
Monitor 1: quick AND brown
Monitor 2: quick AND yellow
that generate the following inverted index:
quick: (1: quick AND brown, 2: quick AND yellow)
brown: (1: quick AND brown)
yellow: (2: quick AND yellow)
Using the above example document, monitors, and index, the following cache list can be generated using the cache list of the first example implementation. Upon processing the first input term "quick", two cache list entries are created:
Monitor ID 1: {quick}, {false}, {false}
Monitor ID 2: {quick}, {false}, {false}
Upon processing the second input term "brown," the cache list entry for Monitor 1 is updated (Monitor 1 is satisfied because the full query has been satisfied and there are no NOT terms), as follows:
Monitor ID 1: {quick, brown}, {true}, {false}
Monitor ID 2: {quick}, {false}, {false}
Processing the remaining terms from the input document do not have any effect on the cache list, as the remaining terms are not present in the index. The result of searching the index using the document as input (as the query), is that Monitor 1 has been satisfied (the full query logic of Monitor 1 has been matched by the input document) and Monitor 2 has not been satisfied. Therefore, Monitor 1 is a match for the input document, while Monitor 2 is not a match. Searching can be performed for one or more additional input documents in a similar manner.

In a second example implementation, a cache list is maintained with the following format:
Monitor ID: {list of found terms}, {Boolean—monitor query satisfied?}, {Boolean—monitor has NOT term(s)}, {Boolean—found NOT therefore exclude}

The second example implementation illustrates how NOT terms in the monitors can be handled.

The following procedure can be used to process documents using the cache list of the second example implementation:
For each term in the input document, if the term occurs in the inverted index:
Create a cache list entry for the monitor(s) if it does not already exist
If term is a NOT, mark "monitor has NOT terms" Boolean to true
Insert the found term into the cache list entry (or entries)
If term is NOT, mark the "exclude" Boolean as true
Check if full query for monitor is satisfied:
If so, mark satisfied (e.g., scoring can be performed normally)
If not, do not mark satisfied (e.g., score 0)
Consider the following example document:
A quick brown fox jumped over the fence.
Also consider the following three example monitors:
Monitor 1: quick AND brown
Monitor 2: quick AND yellow
Monitor 3: brown AND fox AND NOT green
that generate the following inverted index:
quick: (1: quick AND brown, 2: quick AND yellow)
brown: (1: quick AND brown, 3: brown AND fox AND NOT green)
yellow: (2: quick AND yellow)

fox: (3: brown AND fox AND NOT green)
green: (3: brown AND fox AND NOT green)

Using the above example document, monitors, and index, the following cache list can be generated using the cache list of the first example implementation. Upon processing the first input term "quick", two cache list entries are created:

Monitor ID 1: {quick}, {false}, {false}, {false}
Monitor ID 2: {quick}, {false}, {false}, {false}

Upon processing the second input term "brown," the cache list entry for Monitor 1 is updated (Monitor 1 is satisfied because the full query has been satisfied and there are no NOT terms), and a cache list entry for Monitor 3 is created, as follows:

Monitor ID 1: {quick, brown}, {true}, {false}, {false}
Monitor ID 2: {quick}, {false}, {false}, {false}
Monitor ID 3: {brown}, {false}, {true}, {false}

Upon processing the third input term "fox," the cache list entry for Monitor 3 is updated as follows:

Monitor ID 1: {quick, brown}, {true}, {false}, {false}
Monitor ID 2: {quick}, {false}, {false}, {false}
Monitor ID 3: {brown, fox}, {false}, {true}, {false}

Processing the remaining terms from the input document do not have any effect on the cache list, as the remaining terms are not present in the index. The result of searching the index using the document as input (as the query), is that Monitor 1 has been satisfied (the full query logic of Monitor 1 has been matched by the input document), Monitor 2 has not been satisfied, and Monitor 3 has not been satisfied. A remaining step (e.g., a post-processing step) is to check for NOT terms for those monitors that have a NOT term in their query. In this example, Monitor 3 has a NOT term, which was not present in the input document (the "found NOT terms therefore exclude" Boolean for Monitor 3 is false), and thus Monitor 3 is satisfied. Therefore, Monitors 1 and 3 are matches for the input document, while Monitor 2 is not a match. Searching can be performed for one or more additional input documents in a similar manner.

The cache lists in the above first and second example implementations can be examples of a lazy loaded fast checking data structure.

Optimizations can be made to the above processing procedures to increase performance. For example, for a given input document, the number of required terms (any term that is an AND) can be counted. If the input document does not have enough terms matching, then it can be skipped. In addition, upon finding that a "NOT" term has been identified for a monitor (e.g., "Boolean—found NOT therefore exclude" in the cache list example above), subsequent processing of the current document can skip that monitor as it has been excluded.

In addition to determining which monitors match which documents, scoring can be performed. For example, standard search engine scoring techniques can be applied to indicate how closely a monitor matches a document. In a specific implementation, scores are calculated when a match is found between a monitor and a document.

Example Methods for Marching Documents Against Monitors

In the techniques and solutions described herein, an index of monitors can be searched using documents as input (using the documents as the search queries). The index of monitors is searched by matching terms in the input documents against the monitors using the query logic of the monitors.

Figure 3:
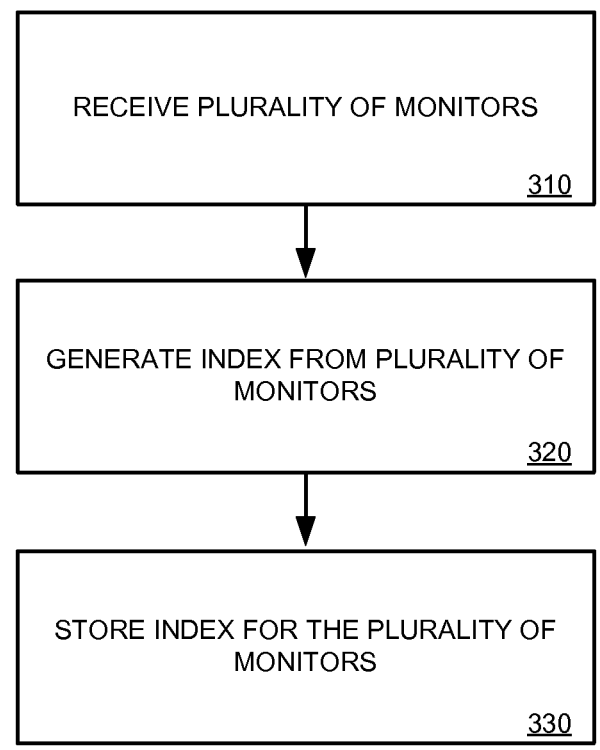
FIG. 3 is a flowchart showing an example method for matching documents against monitors.

FIG. 3 is a flowchart showing an exemplary method 300 for performing searching by matching documents against monitors. At 310, a plurality of monitors are received. For example, the monitors can be retrieved from a database or other repository, or the monitors can be received from a user.

At 320, an index is generated from the received plurality of monitors 310. The index of the monitors represents the full query logic of the monitors. For example, if the monitor is "brown AND fox," then the index represents the full query logic (i.e., the terms "brown" and "fox" as well as the operator "AND"). The full query logic can be stored in the index. For example, an index entry for a monitor term can also store the full query logic for the monitor (e.g., as additional or meta data). The full query logic can be associated with the index. For example, an index entry for a monitor term can comprise a reference or pointer to the full query logic (e.g., the full query logic can be stored in another location from the index, such as a separate database).

At 330, the index for the plurality of monitors is stored. The stored index can be searched (e.g., searched using a monitor search engine). For example, the index can be searched using documents as queries to perform matching against the plurality of monitors stored in the index. The matching can utilize the full query logic of the monitors.

In some implementations, the index is stored locally (e.g., on the same computing device that generated the index). In some implementations, the index is stored (or sent) to one or more other computing devices (e.g., to a number of other computer servers for use in a distributed and/or parallel processing architecture).

Figure 4:
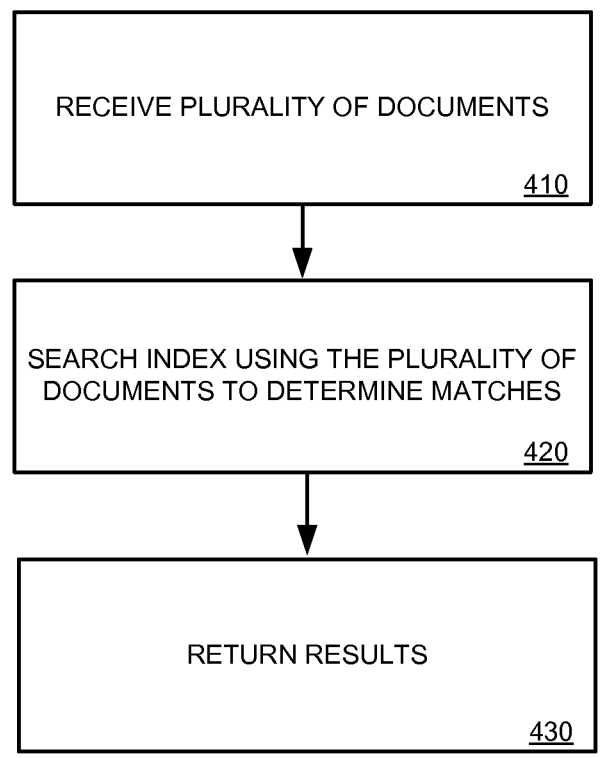
FIG. 4 is a flowchart showing an example method for searching an index of monitors using documents as input.

FIG. 4 is a flowchart showing an exemplary method 400 for determining matches between documents and monitors. At 410, a plurality of documents are received. For example, the plurality of documents can be received as part of a real-time or periodic stream of newly created content on the Internet (e.g., web pages, Twitter posts, blog posts, etc.). The plurality of documents can be processed to put them into a search query format. For example, an input document of "The brown cow jumped over the moon" could be translated into a search query format of "brown OR cow OR jumped OR over OR moon."

At 420, an index of monitors is searched using the plurality of documents 410 as input (as the search queries). The index is searched to determine matches between the plurality of documents 410 and the monitors. The searching uses the full query logic of the monitors as represented in the index (e.g., where the full query logic of the monitors is stored directly in the index or referenced in the index). The searching can be performed by maintaining a cache list of monitors. For example, the cache list can comprise a unique identifier of the monitor, a list of found terms for that monitor, and an indication of whether the full query logic for the monitor has been satisfied. The cache list can also comprise other, or different, information, such as indications of whether NOT terms are present or have been found, scoring information, etc.

At 430, results of the searching are returned. For example, the results can comprise indications of which monitors were matched by which documents, counts of matches, etc. The results can also comprise notifications to users associated with the matched monitors. For example, if a user is associated with a monitor, the user can receive a notification (e.g., email or other type of alert) with a list of documents (e.g., referenced via uniform resource locator (URL)) that match the notification.

Distributed Processing

In the techniques and solutions described herein, an index of monitors can be searched using documents as input using a distributed and/or parallel processing environment. For example, a set of documents can be segregated and stored at various locations (e.g., using a distributed file system). An index of monitors (e.g., a full index) can be searched at each of the various locations (e.g., searched in parallel). Results from the various locations can be combined (e.g., aggregated at a central location).

In a specific implementation, a MapReduce framework (e.g., using the Apache™ Hadoop™ implementation of the MapReduce framework) is used to process subsets of a full set of documents using a collection of computer servers, where each server processes its subset using a full monitor index. Results can then be combined at a central location.

Figure 5:
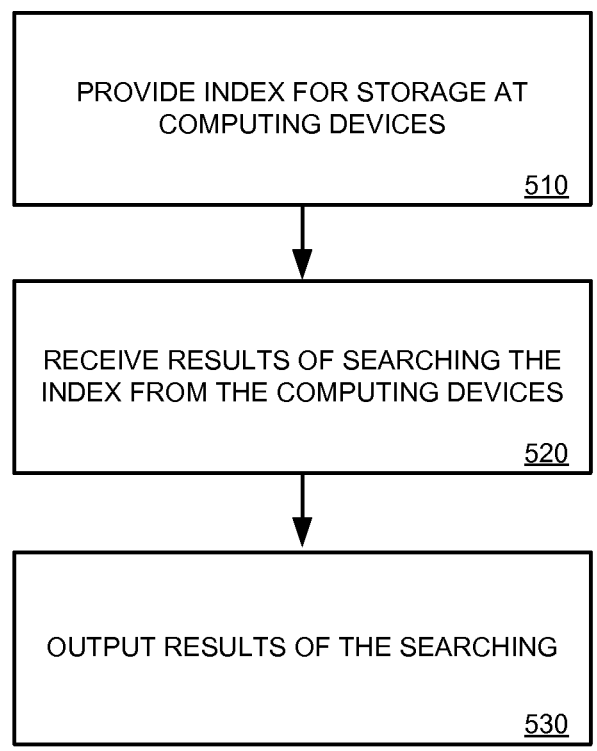
FIG. 5 is a flowchart showing an example method for searching an index of monitors using documents as input in a distributed environment.

FIG. 5 is a flowchart showing an exemplary method 500 for performing searching by matching documents against monitors in a distributed environment. At 510, an index is provided for storage to a plurality of computing devices (e.g., a plurality of computer servers). The index is generated from a plurality of monitors and the index represents full query logic of the plurality of monitors.

At 520, results of searching the index are received from a plurality of computing devices. Each of the plurality of computing devices searches the index (e.g., the full index) using a subset of a plurality of documents, each computing device searches a different subset of the plurality of documents, and the searching can be performed in parallel. For example, a set of documents can be stored using a distributed file system such that each computing device accesses a different subset of the stored documents (e.g., different blocks of the set of stored documents).

At 530, results of the searching are output. For example, results such as indications of which monitors match which documents can be stored, or notifications can be sent based on the matches.

Example Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 6:
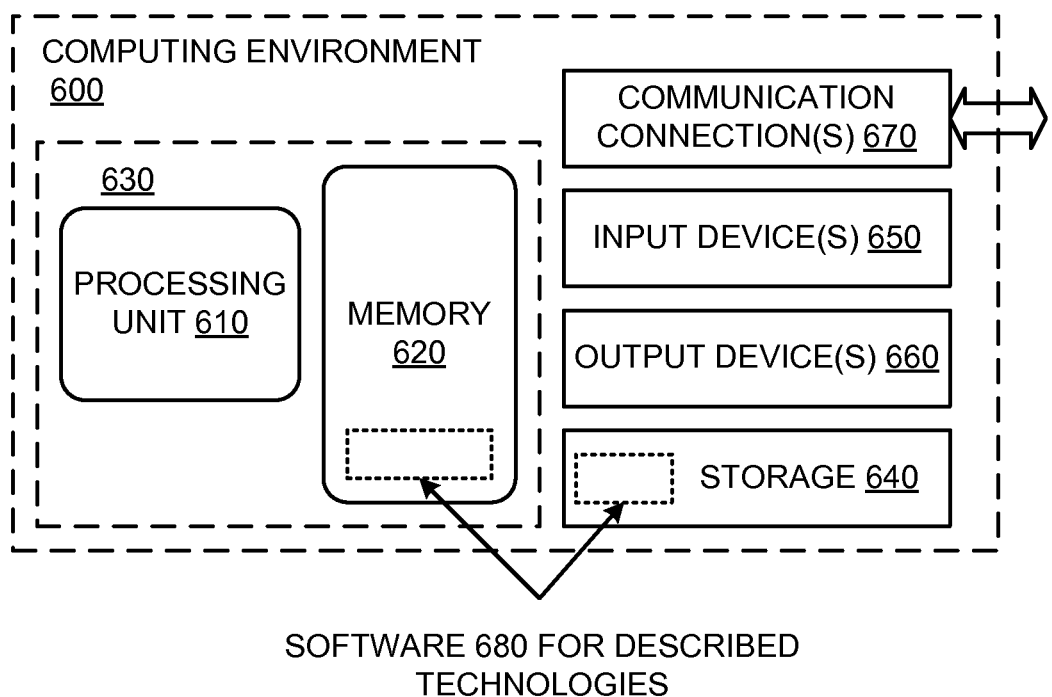
FIG. 6 is a block diagram illustrating an example mobile computing device in conjunction with which techniques and tools described herein may be implemented.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other tangible storage medium which can be used to store information and which can be accessed within the computing environment 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 6, computer-readable storage media include memory 620 and/or storage 640. As should be readily understood, the term computer-readable storage media does not include communication connections (e.g., 670) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A method, implemented at least in part by a computing device, for matching documents against monitors, the method comprising:
   receiving, by the computing device, a plurality of monitors, wherein each monitor includes full query logic and one or more terms;
   generating, by the computing device, an index from the plurality of monitors, the index representing full query logic for the plurality of monitors, wherein the index stores the plurality of monitors using, at least in part, an inverted index, the inverted index including entries for respective terms from the plurality of monitors, wherein an entry for a respective term includes a representation of the full query logic of each monitor having the respective term; and
   storing, by the computing device, the index for the plurality of monitors, wherein the index is searchable using documents as queries to perform matching against the plurality of monitors.

2. The method of claim 1, wherein the index stores the full query logic for each monitor of the plurality of monitors.

3. The method of claim 1, wherein the representation of the full query logic of each monitor is a pointer to the full query logic for each monitor.

4. The method of claim 1, further comprising:
   receiving a plurality of documents;
   searching the index using the plurality of documents as queries to determine matches between the plurality of documents and the plurality of monitors using the full query logic represented by the index, wherein a document matches a monitor when the document is satisfied by the full query logic of the monitor; and
   returning results of the searching.

5. The method of claim 4, wherein the searching the index comprises:
   for each document of the plurality of documents:
      determining which monitors, of the plurality of monitors, are satisfied by the document using the full query logic represented by the index.

6. The method of claim 4, wherein the searching the index comprises:
   for a document of the plurality of documents:
      for each term of a plurality of terms in the document:
         when the term is present in the index:
            saving an indication that the term is present for each monitor containing the term; and
            for each monitor containing the term, determining whether the monitor has been satisfied using the full query logic associated with the monitor.

7. The method of claim 6, wherein the indication is saved in a cache list, wherein the cache list comprises entries for monitors for which at least one term has been found, wherein each entry comprises:
   a unique identifier of the monitor;
   a list of found terms for the monitor; and
   an indication of whether the full query logic for the monitor has been satisfied.

8. The method of claim 6, wherein the indication is saved in a cache list, wherein the cache list comprises entries for monitors for which at least one term has been found, wherein each entry comprises:
   a unique identifier of the monitor;
   a list of found terms for the monitor;
   an indication of whether the full query logic for the monitor has been satisfied;
   an indication of whether the monitor contains a "not" term; and
   an indication of whether a "not" term has been found for the monitor.

9. The method of claim 5, wherein a respective monitor further includes a user associated with the monitor, and the results of the searching are returned to the user when a respective document of the plurality of documents matches the respective monitor.

10. A search system for matching documents against monitors, the search system comprising:
   a processing unit;
   memory; and one or more computer-readable storage media storing computer-executable instructions for causing the search system to perform operations comprising:
receiving a plurality of monitors, each monitor including full query logic and one or more terms;
generating an index from the plurality of monitors, the index representing full query logic for the plurality of monitors, wherein the index stores the plurality of monitors using, at least in part, an inverted index, the inverted index including entries for respective terms from the plurality of monitors, wherein an entry for a respective term includes a representation of the full query logic of each monitor having the respective term; and
storing the index for the plurality of monitors, wherein the index is searchable using documents as queries to perform matching against the plurality of monitors.

11. The search system of claim 10, wherein the index comprises, for each monitor of the plurality of monitors, at least one of:
the full query logic for the monitor; or
a pointer to the full query logic for the monitor.

12. The search system of claim 10, the operations further comprising:
receiving a plurality of documents;
searching the index using the plurality of documents as queries to determine matches between the plurality of documents and the plurality of monitors using the full query logic represented by the index, wherein a document matches a monitor when the document is satisfied by the full query logic of the monitor; and
returning results of the searching.

13. The search system of claim 12, wherein the searching the index comprises:
for each document of the plurality of documents:
determining which monitors, of the plurality of monitors, are satisfied by the document using the full query logic represented by the index.

14. The search system of claim 12, wherein the searching the index comprises:
for a document of the plurality of documents:
for each term of a plurality of terms in the document:
when the term is present in the index:
saving an indication that the term is present for each monitor containing the term; and
for each monitor containing the term, determining whether the monitor has been satisfied using the full query logic associated with the monitor.

15. The search system of claim 14, wherein the indication is saved in a cache list, wherein the cache list comprises entries for monitors for which at least one term has been found, wherein each entry comprises:
a unique identifier of the monitor;
a list of found terms for the monitor; and
an indication of whether the full query logic for the monitor has been satisfied.

16. The search system of claim 14, wherein the indication is saved in a cache list, wherein the cache list comprises entries for monitors for which at least one term has been found, wherein each entry comprises:
a unique identifier of the monitor;
a list of found terms for the monitor;
an indication of whether the full query logic for the monitor has been satisfied;
an indication of whether the monitor contains a "not" term; and
an indication of whether a "not" term has been found for the monitor.

17. The method of claim 13, wherein a respective monitor further includes a user associated with the monitor, and the results of the searching are returned to the user when a respective document of the plurality of documents satisfies the respective monitor.

18. A method, implemented at least in part by a computer, for matching documents against monitors, the method comprising:
providing, by the computer, an index for storage at each of a plurality of computing devices, wherein the index is generated from a plurality of monitors, each monitor of the plurality of monitors including full query logic and one or more terms, the index represents full query logic for the plurality of monitors, and the index stores the plurality of monitors using, at least in part, an inverted index, the inverted index including entries for respective terms from the plurality of monitors, wherein an entry for a respective term includes a representation of the full query logic of each monitor having the respective term; and
receiving, by the computer, results of searching the index from each of the plurality of computing devices, wherein each computing device of the plurality of computing devices searches the index using a subset of a plurality of documents, and wherein each computing device of the plurality of computing devices searches the index using a different subset of the plurality of documents.

19. The method of claim 18, further comprising:
receiving the plurality of monitors; and
generating the index from the plurality of monitors.

20. The method of claim 18, wherein each computing device performs operations comprising:
searching the index, stored at the computing device, using its respective subset of the plurality of documents as queries to determine matches between the subset of the plurality of documents and the plurality of monitors using the full query logic represented by the index; and
returning results of the searching.

21. The method of claim 18, wherein the plurality of documents are stored using a distributed file system, and wherein the subsets of the plurality of documents are accessible by the plurality of computing devices via the distributed file system.

22. The method of claim 18, further comprising:
providing, by the computer, the plurality of documents for storage, wherein the plurality of documents are accessible by the plurality of computing devices.

23. The method of claim 18, further comprising:
outputting results of the searching.

24. The method of claim 18, wherein the method implements a distributed architecture in which the full index is stored at each of the plurality of computing devices, and in which the plurality of documents is segregated such that a separate subset of the plurality of documents is searched in parallel at each of the computing devices using the full index.

25. The method of claim 18, wherein the index comprises, for each monitor of the plurality of monitors, at least one of:
the full query logic for the monitor; or
a pointer to the full query logic for the monitor.

* * * * *